(12) United States Patent
Huang et al.

(10) Patent No.: US 12,705,858 B2
(45) Date of Patent: Aug. 11, 2026

(54) METHOD AND A SYSTEM FOR ANALYZING AN ENGAGEMENT LEVEL OF A SUBJECT FROM A VIDEO

(71) Applicant: Blue Planet Training, Inc., Montclair, NJ (US)

(72) Inventors: Xijie Huang, Hong Kong (CN); Jeffry Wicaksana, Hong Kong (CN); Shih-Yang Liu, Hong Kong (CN); Chi-Hsuan Wu, Taiwan (CN); Xingbo Wang, Hong Kong (CN); Jianben He, Hong Kong (CN); Rui Sheng, Hong Kong (CN); Haipeng Zeng, Shenzhen (CN); Rong Zhang, Hong Kong (CN); Luca Minciullo, Hong Kong (CN); Kai Yiu Wong, Hong Kong (CN); Tsz Cheong Ng, Hong Kong (CN); Kenny Chun Ho Kwan, Vancouver (CA)

( * ) Notice: Subject to any disclaimer, the term of this patent is extended or adjusted under 35 U.S.C. 154(b) by 292 days.

(21) Appl. No.: 18/486,095

(22) Filed: Oct. 12, 2023

(65) Prior Publication Data

US 2025/0124688 A1 Apr. 17, 2025

(51) Int. Cl.
*G06T 7/70* (2017.01)
*G06F 3/01* (2006.01)
(Continued)

(52) U.S. Cl.
CPC .............. *G06V 10/44* (2022.01); *G06F 3/013* (2013.01); *G06T 7/70* (2017.01); *G06V 40/171* (2022.01);
(Continued)

(58) Field of Classification Search
CPC .... G06V 10/44; G06V 40/174; G06V 40/171; G06V 10/806; G06V 40/20; G06V 10/82;
(Continued)

(56) References Cited

U.S. PATENT DOCUMENTS

2013/0232515 A1* 9/2013 Rivera .................. G06Q 30/02 725/12
2021/0090608 A1* 3/2021 Zhang .............. G08B 13/19602
(Continued)

OTHER PUBLICATIONS

Bai, S. et al.; Apr. 19, 2018. An empirical evaluation of generic convolutional and recurrent networks for sequence modeling. arXiv preprint arXiv:1803.01271.
(Continued)

*Primary Examiner* — Syed Haider
(74) *Attorney, Agent, or Firm* — NCC-IP; Nevin Stuart Carmichael

(57) ABSTRACT

The invention relates to a computer implemented method and system for analyzing a video. The method comprises the steps of receiving, via a receiving module, data of the video comprising a series of images showing the subject; extracting, via an extracting module, features related to the subject from the video, the extracting step comprising: extracting, via a first extracting module, a first feature comprises one or more visual characteristics from one or more images of the series of images comprising the video; and extracting, via a second extracting module, a second feature comprises one or more spatial and/or temporal characteristics from the video; and processing, via an analyzing module, the extracted features to determine a score as a scalar representative of an engagement level of the subject.

10 Claims, 4 Drawing Sheets

(51) Int. Cl.
*G06V 10/44* (2022.01)
*G06V 40/16* (2022.01)

(52) U.S. Cl.
CPC .. *G06V 40/174* (2022.01); *G06T 2207/20084* (2013.01)

(58) Field of Classification Search
CPC .................... G06V 10/454; G06T 7/70; G06T 2207/20084; G06F 3/013
See application file for complete search history.

(56) References Cited

U.S. PATENT DOCUMENTS

| | | | | |
|---|---|---|---|---|
| 2021/0176429 A1* | 6/2021 | Peters | .................... | G06V 20/41 |
| 2022/0012901 A1* | 1/2022 | Sun | ...................... | G06V 10/454 |
| 2023/0237844 A1* | 7/2023 | Chang | .................. | G02B 27/017 |
| | | | | 382/103 |

OTHER PUBLICATIONS

Baltrusaitis, T. et al.; May 15-19, 2018. Openface 2.0: Facial behavior analysis toolkit. In 2018 13th IEEE international conference on automatic face & gesture recognition (FG 2018), 59-66. IEEE.

Carreira, J. et al.; May 22, 2017. Quo vadis, action recognition? a new model and the kinetics dataset. In proceedings of the IEEE Conference on Computer Vision and Pattern Recognition, 6299-6308.

Devlin, J. et al.; Oct. 11, 2018. Bert: Pre-training of deep bidirectional transformers for language understanding. arXiv preprint arXiv:1810.0480.

Ekman, P. et al.; 2002, Facial Action Coding System: The Manual on CD ROM. Salt Lake City: A Human Face.

Gupta, A. et al.; Sep. 7, 2016. Daisee: Towards user engagement recognition in the wild. arXiv preprint arXiv:1609.01885.

He, K. et al.; Nov. 13, 2019. Momentum Contrast for Unsupervised Visual Representation Learning. In Proceedings of the IEEE/CVF Conference on Computer Vision and Pattern Recognition (CVPR).

Hjortsjö, CH; 1969. Man's Face and Mimic Language, Studentlitteratur.

Jadoul, Y. et al.; Nov. 2018, Introducing parselmouth: A python interface to praat. Journal of Phonetics, 71: 1-15.

Kaur, A. et al.; Apr. 3, 2018. Prediction and localization of student engagement in the wild. In 2018 Digital Image Computing: Techniques and Applications (DICTA), 1-8. IEEE.

Liao, J. et al.; Feb. 7, 2021. Deep facial spatiotemporal network for engagement prediction in online learning. Applied Intelligence, 51: 6609-6621.

Mcfee, B. et al.; "librosa: Audio and music signal analysis in python." In Proceedings of the 14th python in science conference, pp. 18-25. 2015.

Mehta, N. et al.; Mar. 18, 2022. Three-dimensional DenseNet self-attention neural network for automatic detection of student's engagement. Applied Intelligence, 52(12): 13803-13823.

Selim, T. et al.; Sep. 15, 2022. Students engagement level detection in online e-learning using hybrid efficientnetb7 together with tcn, lstm, and bi-lstm. IEEE Access, 10: 99573-99583.

* cited by examiner

METHOD AND A SYSTEM FOR ANALYZING AN ENGAGEMENT LEVEL OF A SUBJECT FROM A VIDEO

FIELD OF THE INVENTION

The invention relates to a method and a system for analyzing a video. Particularly, but not exclusively, the invention relates to a method and a system for analyzing an engagement level of a subject from a video.

BACKGROUND OF THE INVENTION

Online video communication has shown growing popularity in the recent years due to its convenience. Particularly, the outbreak of COVID-19 has further increased demands and applications for online video communications such as online meetings, learnings and business conferences. Nevertheless, effectiveness of online meetings such as online classes is often questioned when compared with the traditional, face-to-face classes, as it is believed that students are, in general, having lower level of attention when attending lessons online. In face-to-face classes, students are more directly benefited from the interaction within the physical class, and that instructors are allowed to observe the students' reactions such as emotions, facial expressions, body languages more easily to determine engagement levels of the students. These elements are either missing or becoming more difficult during an online class, as very often, students could be muted and that interactive learning are hindered. The detection of students' engagement level during online classes is therefore useful to improve learning efficiency.

Various engagement recognition systems have been developed with an aim to improve users' experience during online meetings and learnings. However, traditional systems are known to show limitations such as, but not limited to, poor label quality and data imbalance in the machine training dataset, as well as intra-class variation from the result engagement classes. For example, datasets such as DAiSEE (Gupta, A.; D'Cunha, A.; Awasthi, K.; and Balasubramanian, V. 2016. *Daisee: Towards user engagement recognition in the wild. arXiv preprint arXiv:*1609.01885) and EngageWild (Kaur, A.; Mustafa, A.; Mehta, L.; and Dhall, A. 2018. *Prediction and localization of student engagement in the wild. In* 2018 *Digital Image Computing: Techniques and Applications* (*DICTA*), 1-8. *IEEE*) separate the degree of engagement into four classes, namely highly disengaged (HD), disengaged (DE), engaged (EG), and highly engaged (HE). The class labels are ineffective as the class labels only indicate the engagement level of users in four set ranges or categories. Students being labeled to the same engagement class still demonstrate different engagement levels. For instance, some students labeled as engaged (EG) may, when being observed closer, be in fact highly engaged (HE) when compared to other students in the same class. The existing systems therefore lack accuracy as the true engagement levels of students have inevitably been generalized by the four classes.

The selection of features to be analyzed from the video is also crucial in determining a student's engagement level during online classes. However, most existing engagement detection systems are limited only to high-level features such as the head and body positions of the students. The benefit of analyzing high-level visual features is that it neglects background noises and/or other clearly irrelevant information from the video. However, the focusing on high-level features only may result in the losing of a lot of other useful information such as movement and behavioral information of students, which are not collectable from the high-level features.

On the other hand, artificial-intelligent (AI) based analysis on images and videos has been used in engagement prediction. For example, Liao, Liang, and Pan (Liao, J.; Liang, Y.; and Pan, J. 2021. *Deep facial spatiotemporal network for engagement prediction in online learning. Applied Intelligence,* 51: 6609-6621) disclosed combined SENet and LSTM with global attention layers to extract facial spatial features and temporal features. Mehta et al. (Mehta, N. K.; Prasad, S. S.; Saurav, S.; Saini, R.; and Singh, S. 2022. *Three-dimensional DenseNet self-attention neural network for automatic detection of student's engagement. Applied Intelligence,* 52(12): 13803-13823) combined the 3D DenseNet and a 3D self-attention module to capture the global relationship between the features. Selim, Elkabani, and Abdou (Selim, T.; Elkabani, I.; and Abdou, M. A. 2022. *Students engagement level detection in online e-learning using hybrid efficientnetb*7 *together with tcn, lstm, and bi-lstm. IEEE Access,* 10: 99573-99583) further utilized EfficientNetB7 and different temporal networks such as LSTM, Bi-LSTM, and TCN. However, all these studies have failed to demonstrate practical improvement in the determination of user's engagement level in the settings of online meetings or online learnings.

OBJECTS OF THE INVENTION

An object of the invention is to mitigate or obviate to some degree one or more problems associated with known systems and methods for engagement detection.

Another object of the invention is to provide an improved system and method for analyzing engagement level of subjects in a video.

A further object of the invention is to provide an improved system and method for analyzing engagement level of participants of online classes or meetings.

The above object is met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

The present invention generally relates to an artificial intelligence (AI) based, computer implemented method and system for analyzing engagement level of one or more subjects from a video. The analysis can be conducted real-time during a live video meeting or online class. The video can also be a pre-recorded video showing an online meeting or online class with participants. Particularly, the present invention is adapted to analyze multi-modal features of one or more subjects or participants from a video. Features such as high-level, visual characteristics, spatial-temporal characteristics, as well as audio feature associated with the video, can be extracted and analyzed based on one or more AI machine learning algorithms. More preferably, other non-verbal communication data such as text message including instant messaging and chatroom messages, user's reactions and responses such as digital graphic icons inputted by users during the video conference can also extracted and analyzed. The system of the invention analyzes the multi-modal features via AI machine learning models to generate scores which reflect the participants' engagement level in the form of a scalar. Suggestions or hints corresponding to the scores may further be generated and displayed to the users via their computer devices where the system operates. The hints can be provided in the form of advices to help improving the users' engagement levels, for example, "Please position yourself in the center of the screen!". The present invention therefore provides a useful and effective system and method for determining engagement level of users in a video. Application of the present invention may further be extended to facilitate speeches or presentations made by the users, with the presentation videos being captured real-time or recorded for analysis by the system.

In a first main aspect, the invention provides a computer implemented method for analyzing an engagement level of a subject from a video. The method comprises receiving, via a receiving module, data of the video comprising a series of images showing the subject; extracting, via an extracting module, features related to the subject from the video, with the extracting step comprising: extracting, via a first extracting module, a first feature comprises one or more visual characteristics from one or more images of the series of images comprising the video; and extracting, via a second extracting module, a second feature comprises one or more spatial and/or temporal characteristics from the video; and processing, via a processing module, the extracted features to determine a score as a scalar representative of an engagement level of the subject.

In a second main aspect, the invention provides a system implementing the method of the first main aspect for analyzing an engagement level of a subject from a video. The system comprises a receiving module configured to receive a data of the video comprising a series of images of the subject; an extracting module configured to extract features related to the subject shown in the video, with the extracting module comprising a first extracting module for extracting a first feature comprises one or more visual characteristics from one or more images of the series of images comprising the video; and a second extracting module for extracting a second feature comprises one or more spatial and/or temporal characteristics from the video; and a processing module adapted to process the extracted features to determine a score as a scalar representative of an engagement level of the subject.

In a third main aspect, the invention provides a non-transitory computer readable medium storing machine-readable instructions which, when implemented on a processor, implementing the method of the first main aspect.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
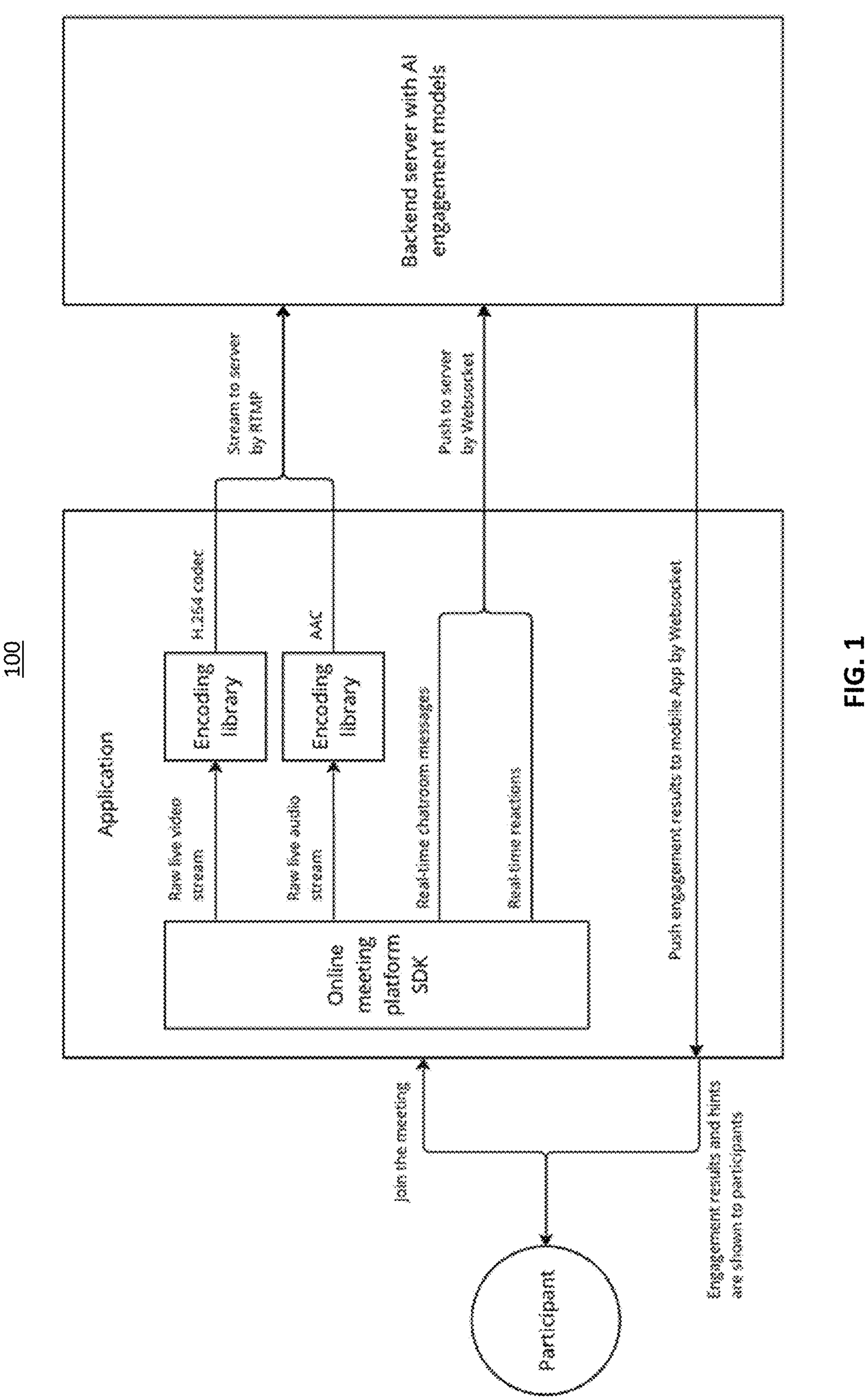
FIG. 1 shows a technical implementation of a system for analyzing an engagement level of a subject from a video in accordance with an embodiment of the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the figures, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e. any elements developed that perform the same function, regardless of structure.

Thus, for example, it will be appreciated by those skilled in the art that the block diagrams presented herein represent conceptual views of systems embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The invention generally relates to an artificial intelligence (AI) based, computer implemented method and system for analyzing engagement level of one or more subjects from a video. The analysis can be conducted real-time during a live video meeting or based on a pre-recorded video showing the subject. The video meeting can be conducted via existing software development kits (SDK) or platforms for video communication purposes. Particularly, the present the invention analyzes multi-modal features of the subject as shown in the video. Features such as high-level, visual characteristics, spatial-temporal characteristics, as well as audio feature associated with the video, can also be extracted and analyzed based on one or more AI machine learning algorithms. Other non-verbal communication data such as text message including instant messaging and chatroom messages, user's reactions and responses such as digital graphic icons inputted by users during the video conference can also extracted and analyzed. Based on the multi-modal analysis, the system generates engagement scores which reflect the participants' engagement level in the form of a scalar. Suggestions, hints or advices corresponding to the scores may further be generated and displayed to the users via their computer devices where the system operates to help improving the subject's engagement level in the/a meeting.

Referring to FIG. 1, shown is a simplified flow diagram illustrating a technical implementation of the system 100 according to an embodiment of the present invention. The system 100 can be implemented in any computer devices such as a desktop computer, a laptop computer, a tablet and/or a mobile phone installed with a program or application such as a software development kit (SDK) providing a video communication platform for online video conferences. Preferably, the video communication platform allows users to create and conduct online video meetings or lessons. Preferably, the video communication platform is configured with functionalities to support extraction of participants' live data in real time. For example, when operates cooperatively with the video communication platform, the system 100 is capable of capturing real-time data from each participant, which may include video data, audio data, chatroom messages, and/or participant's reactions, etc. The system 100 may include or can be connected to a backend server, which processes artificial intelligent (AI) algorithms based on the extracted data to analyze the user engagement level as a score in the form of a scaler. Results from the analysis will then be sent for displaying at the user device, showing the engagement level as a score and optionally, suggestions correspond to the score for improving the user's engagement during an online meeting or an online class.

Figure 2:
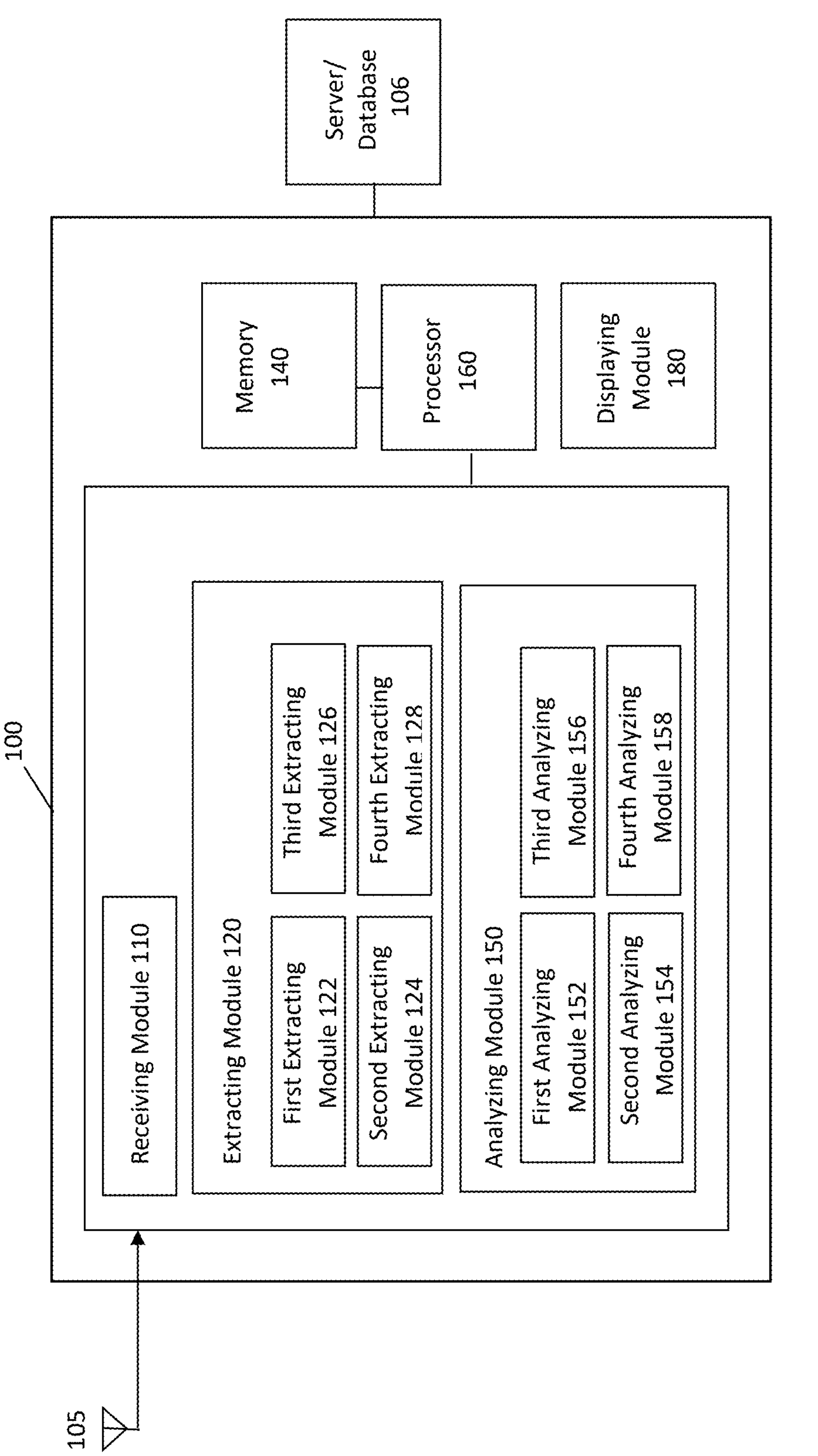
FIG. 2 is a schematic block diagram showing an exemplified implementation of the system of FIG. 1.

FIG. 2 further illustrates an embodied system 100 according to the concept of the present invention. In this embodiment, the system 100 may comprise or be implemented at a computer processing device such as a communication equipment in the form of a smart phone, a tablet computer, a laptop computer, a personal computer (PC), or the like, although any suitable data or signal processing device or system may also be utilized. The system 100 can be connected via a communication network to a server and/or to a database 106 or the like, although this is not essential to the implementation of the invention. The communication network may comprise a wireless network, e.g. a wireless cellular network, a wired network, the internet or any combination of the foregoing.

The system 100 may comprise a plurality of functional blocks for performing various functions thereof. For example, the system 100 may include a receiving module 110 configured to receive data such as a video data comprising a series of images or frames showing one or more subject person. The receiving module 110 may comprise various data sink, control element(s), user interface(s), etc. Although the receiving module 110 is described as a receiver for signal or data, it will be appreciated that this functional block may be implemented as a transceiver providing both transmitting and receiving of signal or data such as via antenna 105 and/or another type of system input, although it will be understood that video data in the form of recorded online lessons, meetings and/or other video clips may be received or inputted to the receiving module 110 of the system 100 by suitable means familiar to one skilled in the art. In one specific embodiment, the receiving module 110 can be configured to receive raw live video data in any known video stream format, such as the YUV420 format. The receiving module 110 may then encode the video stream format into a video codec, such as a H.264 codec using off-the-shelf encoding frameworks available for computer devices. The receiving module 110 may further receive raw live audio data in any commercial format, such as the PCM format, which will then be encoded into an audio codec such as an AAC using off-the-self encoding frameworks available for computer devices. Preferably, the receiving module 110 may further receive real-time reactions data supported by the SDK such as participants' reactions, chatroom messages and/or other actions provided by the participants.

The system 100 may further comprise an extracting module 120 for extracting features related to the subject person from the video. Preferably, the extracting module 120 comprises a first extracting module 122 and a second extracting module 124. The first extracting module 122 is configured to extract a first feature comprises one or more visual characteristics from one or more images of the series of images comprising the video; and the second extracting module 124 is configured to extract a second feature comprises one or more spatial and/or temporal characteristics from the video.

More preferably, the system 100 may comprise an analyzing module 150 adapted to process the extracted features and to determine a score as a scalar representative of a determined engagement level of the subject. In the context of the present invention, the term "scalar" relates to an exact quantity described by a magnitude, and when used in relation to the engagement level of a subject, it refers to an engagement score provided in an exact quantity. This is in contrast to the prior art technology in which results from the prediction of engagement of a subject is designated to predetermined categories or classes, which imply a generalized, diverse range of engagements levels. The exact determination of engagement score in the form of a scalar of the present invention can be preferably be outputted or displayed by a display module 180 and, in one embodiment, the display module 180 can be configured further to output or display a suggestion or advice corresponds to the determined score to improve the subject's engagement such as, by presenting a hint sentence of "Please position yourself in the center of the screen!" as a push notification at the display of the device. In one embodiment, the extracting module 120 and/or the analyzing module 150 can be provided at a server 106 such as a cloud server, a backend server or the like.

Although the receiving module 110, the extracting module 120, the analyzing module 150 and the displaying module 160 as shown in the embodiment of FIG. 2 are deployed as functional components of the system 100, there is no limitation to such a deployment configuration according to the concepts of the invention. For example, one or more of these modules may be deployed as respective functional blocks that is distinct from, but connected to, the system 100. One or more of the receiving module 110, the extracting module 120, the analyzing module 150 and the displaying module 160 can be separately implemented using logic circuits and/or executable code/machine readable instructions stored in a memory 140 of the system 100 for execution by a processor 160 to thereby perform functions as described herein. For example, the executable code/machine readable instructions may be stored in one or more memories 140, e.g. random access memory (RAN), read only memory (ROM), flash memory, magnetic memory, optical memory or the like, suitable for storing one or more instruction sets, e.g. application software, firmware, operating system, applets, and/or the like, data, e.g. configuration parameters, operating parameters and/or thresholds, collected data, processed data, and/or the like, etc. The one or more memories 140 may comprise processor-readable memories for use with respect to one or more processors 160 operable to execute code segments of any one or more of the functional modules as described above, and/or to utilize data provided thereby to perform functions of the system 100 as described herein. Additionally, or alternatively, one or more of the receiving module 110, the extracting module 120, the analyzing module 150 and the displaying module 160 may comprise one or more special purpose processors, e.g. application specific integrated circuit (ASIC), field programmable gate array (FPGA), graphics processing unit (GPU), and/or the like configured to perform functions of the system 100 as described herein.

Preferably, the first feature extracted by the first extracting module 122 may comprise or relate to high-level, visual features or characteristics of a subject person during an online video meeting. The high-level, visual features may include, but are not limited to, visual characteristics derivable from one or more two dimensional images showing the subject. For example, the first feature may include visual characteristics showing one or more facial and/or body characteristics of the subject shown in one or more images or frames comprising the video. In one embodiment, the one or more facial and/or body characteristics may comprise facial action, head position, and/or gaze direction of the subject. In one embodiment, the facial action may comprise one or more facial action units based on the Facial Action Coding System (FACS) (Hjortsjö C H (1969). *Man's Face And Mimic Language*; Ekman P, Friesen W V, Hager J C (2002) *Facial Action Coding System: The Manual on CD ROM. Salt Lake City: A Human Face*). In one specific embodiment, the high-level features can be extracted by OpenFace 2.2.0 (Baltrusaitis, T.; Zadeh, A.; Lim, Y. C.; and Morency, L.-P. 2018. *Openface 2.0: Facial behavior analysis toolkit*. In 2018 *13th IEEE international conference on automatic face & gesture recognition (FG 2018)*, 59-66. *IEEE*). High-level features are useful as they provide general but essential information for engagement prediction. The features of facial action, head position and/or gaze direction may further comprise other engagement-related features such as nodding, yawning, looking down, etc. which assist in engagement determination. Another benefit of utilizing high-level features in engagement analysis is that it reduces interference from noise data such as backgrounds and clothes of the participants, etc. as shown in the video.

The second feature extracted by the second extracting module 124 may comprise one or more spatial and/or temporal characteristics obtained from the video. Particularly, the spatial and/or temporal characteristics of the second feature may comprise, for example, features learned by a neural network when trained for action classification (Carreira, J.; and Zisserman, A. 2017. *Quo vadis, action recognition? a new model and the kinetics dataset*. In *proceedings of the IEEE Conference on Computer Vision and Pattern Recognition,* 6299-6308). In one embodiment, the spatial and/or temporal characteristics of the second feature can be represented by a vector data, and more preferably, an inflated three-dimensional (I3D) vector.

While the high-level features may capture the state of a single frame, the spatial-temporal information of the participants will not be derivable from the high-level data and therefore, important information relevant to the subject's engagement would be missed if a system may only rely on extraction and analysis of high-level features from the video. Also, there could be facial expressions that are not fully captured by the high-level features. The present invention therefore utilizes an Inflated 3D Networks (I3D) (Carreira, J.; and Zisserman, A. 2017. *Quo vadis, action recognition? a new model and the kinetics dataset*. In *proceedings of the IEEE Conference on Computer Vision and Pattern Recognition,* 6299-6308) to compensate the neglected information and to extract further spatial and/or temporal features from the video. I3D is a three-dimensional (3D) video classification network that contains a 3D Convolutional network and optical flow to extract spatiotemporal information.

In one further embodiment, the extracting module 120 may further comprise a third extracting module 126 for extracting a third feature comprising one or more audio characteristics associated with data of the video. The audio characteristics of the third feature may comprise one or more of a volume, a pitch, a length of an utterance, a duration of an utterance, a content of an utterance, and/or a sentiment of an utterance of or represented by the audio characteristics. For example, the audio characteristics can be extracted by using Parselmouth (Jadoul, Y.; Thompson, B.; and De Boer, B. 2018. *Introducing parselmouth: A python interface to praat. Journal of Phonetics,* 71: 1-15); McFee, Brian, Colin Raffel, Dawen Liang, Daniel P W Ellis, Matt McVicar, Eric Battenberg, and Oriol Nieto. "*librosa: Audio and music signal analysis in python*." In *Proceedings of the 14th python in science conference*, pp. 18-25. 2015. The speech content can be extracted by the Zoom Live Transcript as input.

The extracting module 120 may further comprise a fourth extracting module 128 for extracting a fourth feature comprising input from a user. The user input may comprise non-verbal feedback such as one or more of a text data such as instant messages and/or chatroom messages, a graphic data and/or an image data such as meeting reactions and/or digital graphic icons in the form of "Emojis" sent between different users participating in the online meeting. The fourth feature may further comprise one or more of a frequency of input from a user, a duration between inputs from the user, a reaction from one user to the other users, and/or a degree of responsiveness of the user. In one specific embodiment, the user input of the fourth features can be extracted by existing video communication software or platforms which support users' reaction extraction functionalities such as, but are not limited to, Zoom™. Google Meet™, Microsoft Teams™, Skype™, etc.

Figure 3:
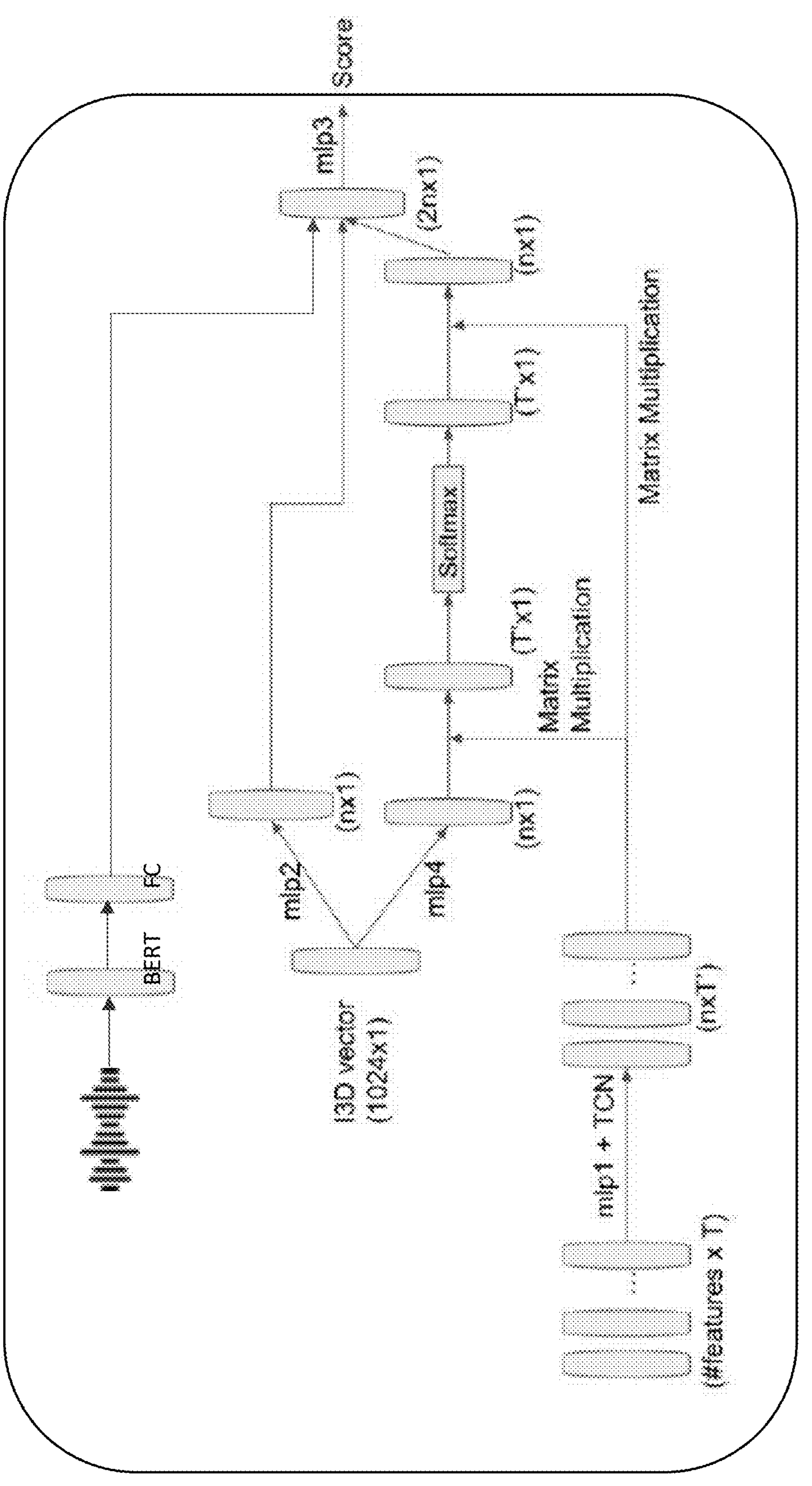
FIG. 3 is a flow diagram showing an embodied data processing of FIG. 1.

A flow diagram showing a processing model according to an embodiment of the present invention is shown in FIG. 3.

Preferably, the multi-modal characteristic features extracted by the extracting module 120 will be processed by the analyzing module 150. For example, the extracted first feature comprising the high-level, visual characteristics from one or more images or frames forming the video will be analyzed by a first analyzing module 152 of the analyzing module 150; and the spatial and/or temporal characteristics of the second feature will be analyzed by a second analyzing module 154 of the analyzing module 150. More preferably, the analyzing of the first and/or the second analyzing modules 152, 154 are based on one or more AI machine learning algorithms. In one specific embodiment, the first analytic module 152 is preferably adapted to process data from the first feature based on a temporal convolution network (TCN); and the second analytic module 154 is preferably adapted to process data from the second feature based on a multi-layer perceptron neutral network (MLP).

In one embodiment, the high-level, first feature extracted from the video can be analyzed by splitting the video into T segments with equal lengths. For videos having a length under 10 seconds, the video is repeated until it contains more than 250 frames. To obtain the first, high-level feature from each segment, the minimum, maximum, and variance of the high-level features are derived based on $s \in R^{D \times T}$ and then, concatenated them into a feature vector denoted as $ps \in R^{3D \times T}$.

Next, a Temporal Convolutional Network (TCN) (Bai, S.; Kolter, J. Z.; and Koltun, V. 2018. *An empirical evaluation of generic convolutional and recurrent networks for sequence modeling. arXiv preprint arXiv:*1803.01271) can be utilized to capture spatial and/or temporal patterns from the feature vector ps. The resulting output from the TCN can be denoted as $X_{TCN} \in R^{C \times T}$ It is found that TCN surpasses other commonly employed models for engagement prediction and particularly, the known limitations with data imbalance can be significantly improved.

To address the varying discriminative power of each time step in $X_{TCN}$, an attention mechanism has been utilized to filter $X_{TCN}$. An attention weight can be generated based on the processed data from the first feature and the processed data from the second feature. The generated attention weight is further processed with the data from the first feature to determine a score as a scalar representative of an engagement level of the subject.

The attention score can be computed using the feature $X_{I3D} \in R^d$ extracted from the I3D module, which contains important spatial and/or temporal characteristics that assist in the filtering process. This operation can be described by the following equations:

$$X_{attn} = \text{Softmax}(MLP_1(X_{I3D}) \times X_{TCN}) \tag{1}$$

$$X_{HL} = X_{TCN} \times X_{attn} \tag{2}$$

where $MLP_1$ consists of two Fully Connected (FC) layers and a dropout layer with the last FC layer having C hidden units, $X_{attn} \in R^{T'}$ acts as an attention score for $X_{TCN}$, and $X_{HL} \in R^C$.

As mentioned earlier, the features extracted by the I3D module may include information which were overlooked from the high-level features. Therefore, in addition to the high-level features $X_{HL}$, we combine them with $X_{I3D}$ to create a combined feature representation for downstream prediction. This combination is achieved through concatenation, resulting in:

$$X = CONCAT(MLP_2(X_{I3D}), X_{HL}) \tag{3}$$

Here, $MLP_2$ consists of two fully connected (FC) layers with a rectified linear unit (ReLU) layer in between. The last FC layer has C hidden units. By concatenating the output of $MLP_2$ with $X_{HL}$, the combined feature representation $X \in R^{2C}$ is obtained. Subsequently, the model prediction based on X can be formulated as:

$$s = MLP_3(NORM(X)) \tag{4}$$

MLP3 is implemented as a normalized FC layer which incorporates a normalized weight vector without bias. With X being normalized, s is a scalar within [−1, 1]. A higher value suggests a high degree of engagement of the subject. Subsequently, a threshold of (−0.5, 0, 0.5) can be employed to classify the data into one of four engagement levels, such as but are not limited to, highly disengage (HD), disengage (DE), engage (EG), and highly engage (HE).

Considering that engagement is not merely confined to discrete categories but exists as exact units along a spectrum, it is preferred to predict the level of engagement as a scalar, which allows for a continuous representation of engagement levels. It enables the model to capture subtle variations and nuances in the level of engagement, which may vary within the same engagement class. This emphasis on the ordinal relationship and continuous representation enables the invention to better handle the complexity of engagement prediction and provide more informative and nuanced results.

The analyzing module 150 may further comprise a third analyzing module 156 configured to analyzed the extracted third, audio feature. In one embodiment, a pre-trained BERT model (Devlin, J.; Chang, M.-W.; Lee, K.; and Toutanova, K. 2018. *Bert: Pre-training of deep bidirectional transformers for language understanding. arXiv preprint arXiv:* 1810.0480) can be utilized to extract the audio features from the speech sp. In one embodiment, metadata of the volume and the pitch is selected and processed with the operation shown as below:

$$X_{sp} = FC(BERT(sp)) \tag{5}$$

$$X_{aud} = [L, Hv, Lv, Hp, Lp, std_v, std_p] \tag{6}$$

$$X' = CONCAT(X, X_{sp}, X_{aud}) \tag{7}$$

$$s = MLP3(Norm(X')) \tag{8}$$

where $X_{sp} \in R^{768}$, $X_{aud} \in R^7$ includes the speech length L, percentage of high volume Hv, percentage of low volume Lv, percentage of high pitch Hp, percentage of low pitch Lp, and standard deviation of volume $std_v$ and pitch $std_p$. These multi-modal features, denoted as X', are then fed into the downstream head of the model which is identical to when only visual features were considered.

The analyzing module 150 may further comprise a fourth analyzing module 158 to process and analyze the extracted fourth feature based on user input. For example, for textual data extractable from the user chatroom, features such as sentiment and text length. The 'sentiment' feature is the sentiment polarity score, such as positive value for positive sentiment and negative value for negative sentiment, can be computed using the textblob library (https://textblob.readthedocs.io/en/dev/). The 'text length' feature is the number of words typed. Other non-textual interactions, such as using emojis, reactions and sharing visuals were represented using a binary feature vector whose length is the number of interactions that can be performed. Each vector element had a "1" placed if the corresponding interaction was performed and a "0" otherwise.

As previously mentioned, subjects within the same class may have various behaviors and that they may demonstrate similar but not exactly the same engagement level. In order to account for intra-class variations effectively when designing the loss criteria, it is crucial to avoid imposing a common ground truth on each class. However, to train the model with mean-squared loss (MSE Loss), setting a common ground truth for each class is required. The invention is specifically designed to handle the complexities of intra-class variations and ordinal relationships, enabling more accurate and robust learning for engagement prediction.

Figure 4:
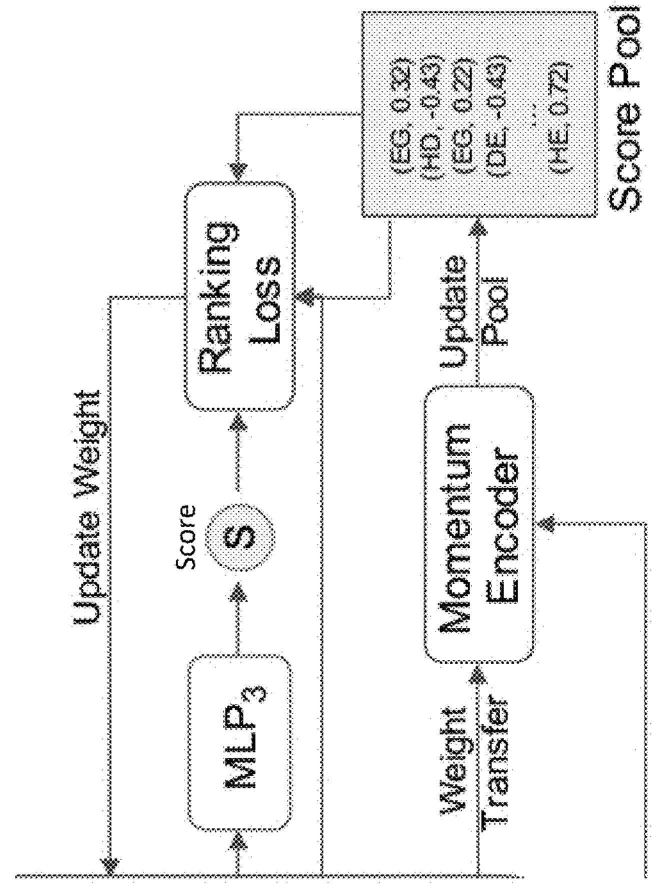
FIG. 4 is a flow diagram showing another embodied data processing of FIG. 1.

Referring also to FIG. 4, the invention introduces the margin ranking loss as a means of training the model using relative assessments rather than relying solely on absolute assessments of individual data points. This approach makes it easier to learn from comparisons between different combinations of data, which can facilitate better representation learning for minority classes in cases of data imbalance. Framework of the invention comprises two primary components: the sampling process, which involves a Momentum Encoder and Score Pool, and the margin ranking loss which utilizes the results obtained from the sampling process to compute the final loss. Particularly, the invention utilized the sampling mechanism from the MoCo method (He, K.; Fan, H.; Wu, Y.; Xie, S.; and Girshick, R. 2020. *Momentum Contrast for Unsupervised Visual Representation Learning. In Proceedings of the IEEE/CVF Conference on Computer Vision and Pattern Recognition* (*CVPR*)) to generate engagement scores for the margin ranking loss function. The idea behind this approach is to maintain a score pool of pre-predicted engagement scores generated with the momentum encoder from different classes which serves as a reference point for evaluating the suitability of predicted scores for other data. The momentum encoder shares the same structure as the training model and is initialized with the same weights. Besides, the momentum encoder is updated for each iteration by retaining 99.9% of its current weight and incorporating 0.1% of the model's weight. This gradual update of the momentum encoder ensures that the generated scores remain relatively consistent and do not fluctuate excessively after each iteration.

In every training iteration, a momentum encoder processes a mini-batch of data with a size denoted as |BK, producing a score for each data point. These scores, along with the feature embeddings before the prediction head, and their respective ground truth labels, are combined into triplets. These triplets are then stored in a score pool, which operates on a first-in, first-out (FIFO) principle. The score pool has a predetermined length of |P| and it is initially filled with data triplets from four different engagement levels, shuffled randomly to ensure a diverse mix of examples. Similar to the rationale behind the update of the momentum encoder, the invention updates the score pool as a queue by removing the |BI most outdated data triplets during each iteration to ensure a more steady transition.

The margin ranking loss uses the scores St generated by the training model, in combination with the score pool P, to calculate the loss for updating the weight of the training model. The margin ranking loss with respect to one batch of training samples can be formulated as:

$$L = \frac{1}{|B| \times |P|} \sum_{l_1, d_1 \in B} \sum_{l_2, s_2, e_2 \in P} \max(f(l_1, d_1, l_2, s_2, e_2), 0)$$

$$f(l_1, d_1, l_2, s_2, e_2) = \begin{cases} L_1(\text{model}(d_1) - s_2) & \text{if } l_2 = l_1 \\ M_{|l_2 - l_1|} - (\text{model}(d_1) - s_2) & \text{if } l_1 > l_2 \\ M_{|l_2 - l_1|} - (s_2 - \text{model}(d_1)) & \text{if } l_1 < l_2 \end{cases}$$

$$\begin{cases} M_1 : 0.25 * (CosineSimilarity(e_1, e_2) + 1)/2 \\ M_2 : 0.5 + 0.25 * (CosineSimilarity(e_1, e_2) + 1)/2 \\ M_3 : 1.0 + 0.25 * (CosineSimilarity(e_1, e_2) + 1)/2 \end{cases}$$

where B denotes the training batch and data $d_1$ with its label $l_1$ representing one training sample of B, and P is the score pool where each element is a triplet of ground truth label, predicted score, and the corresponding high dimensional features ($l_2$, $s_2$, $e_2$). The margin $M_{diff}$ is determined by considering two factors: the difference between the labels of the two data points and the cosine similarity between their embeddings. $e_1$ is the high dimensional features of $d_1$ prior to the prediction head of the training model, while $e_2$ is the representation of d2 obtained previously from the momentum encoder and saved in the score pool. A larger margin is imposed when the label difference between the two data points is bigger or when the feature vectors of the two data points from different classes are closer to each other. For example, suppose $d_1$ is HE and $d_2$ is DE, then the loss will be calculated as $$M_2 - (\text{model}(d_1) - s_2),$$

where if $M_2 > (\text{model}(d_1) - s_2)$, the model will receive penalty from the loss.

The underlying concept behind the margin rank loss is that it is anticipated a subject's level of engagement to be predicted with a score that is higher than those of less engaged subjects and lower than those of more engaged subjects, where the score difference should be larger than the margin suggested by the label difference. Also, cosine similarity is used to calculate the threshold flexibly. Such a method can increase the penalty when two data from different classes are having similar representations, and decrease the penalty when the relativity of the score of the two data is well predicted.

Efficacy of the invention based on the trained model on a combination of various features has been evaluated. In the experiment, the combination of visual feature comprising the first feature of high-level characteristics, the second feature of spatial-temporal characteristics, and the third feature of audio characteristics have been adopted. Only the visual segment is employed to make predictions for video segments without speech, while the full model is utilized for predicting video segments that include speech.

TABLE 1

Accuracy using different combinations of features, where Openface was used to extract and analyze the first feature, I3D was used to extract and analyze the second feature, and Audio refers to the third, audio feature.

| Feature | Acc.(%) | Avg Acc.(%) |
|---|---|---|
| Openface | 70.44 | 46.76 |
| I3D | 72.43 | 58.76 |
| Openface + Audio | 68.38 | 46.64 |
| I3D + Audio | 68.79 | 52.83 |
| Openface + I3D | 78.14 | 55.74 |
| Openface + I3D + Audio | 78.55 | 56.85 |

TABLE 2

Comparison of model with and without using audio features, where Openface was used to extract and analyze the first feature, I3D was used to extract and analyze the second feature, and Audio refers to the third, audio feature.

| Model | Acc.(%) | Avg Acc.(%) |
|---|---|---|
| Openface + I3D | 71.42 | 60.23 |
| Openface + I3D + Audio | 74.60 | 63.70 |

It was revealed that the first feature comprising high-level characteristics and the second feature represented by I3D vectors together improve the performance of the invention when compared to prior art technology which extracts only single modal feature. The method of the invention to combine the I3D vectors with high-level feature is further shown to demonstrate more superior performance over the prior art by simply concatenating the two features. Features from different levels are found to be complementary and provide useful information for making engagement predictions.

Additionally, the result suggests that multi-modality analysis is beneficial to engagement prediction. In Table 2, for the data which contains the speeches, models trained on both visual and audio features demonstrated significantly better performance on both accuracy and average accuracy.

TABLE 3

Comparison of different methods to combine the first, high level feature and the second, spatial-temporal feature.

| Method | Acc.(%) | Avg Acc.(%) |
|---|---|---|
| attention | 74.09 | 50.32 |
| concat | 76.98 | 52.50 |
| concat + attention | 78.14 | 55.74 |

In another aspect, the present invention further relates to a non-transitory computer readable medium storing machine-readable instructions which, when implemented on a processor, implements the steps of the method as described above.

The system and the various modules described above may be implemented at least in part in software. Those skilled in the art will appreciate that the various modules described above may be implemented at least in part using general purpose computer equipment or using bespoke equipment.

Here, aspects of the system and method described herein can be executed on any device or apparatus comprising the system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory storage media, terms such as computer or machine-readable medium refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

What is claimed is:

1. A computer implemented method for analyzing an engagement level of a subject from a video, comprising the steps of:

receiving, via a receiving module, data of the video comprising a series of images showing the subject;

extracting, via an extracting module, features related to the subject from the video, the extracting step comprising:

extracting, via a first extracting module, a first feature comprises one or more visual characteristics related to the subject from one or more images of the series of images comprising the video; wherein the visual characteristics of the first feature comprise one or more facial and/or body characteristics of the subject as shown in the one or more images of the series of images comprising the video; and extracting, via a second extracting module, a second feature comprises one or more spatial and/or temporal characteristics related to the subject from the video; wherein the spatial and temporal characteristics of the second feature are represented by a vector data; wherein the vector data comprises an inflated three-dimensional (I3D) vector; and processing, via an analyzing module, the extracted first and second features related to the subject, the processing step comprises:

analyzing the extracted first feature via a first analyzing module, and analyzing the extracted second feature via a second analyzing module;

wherein the analyzing steps of the first and/or the second analyzing modules are based on one or more machine learning algorithms; wherein the first analyzing module is adapted to process data from the first feature based on a temporal convolution network (TCN) comprising the one or more machine learning algorithms; and wherein the second analyzing module is adapted to process data from the second feature based on a multi-layer perceptron neural network (MLP) comprising the one or more machine learning algorithms;

wherein the processing step further comprises generating an attention weight based on processed data from the first feature and processed data from the second feature; the generated attention weight is further processed with the data from the first feature to determine a score as a scalar representative of the engagement level of the subject.

2. The method according to claim 1, wherein the one or more facial and/or body characteristics comprise facial action, head position, and/or gaze direction of the subject as shown in the one or more images comprising the video.

3. The method according to claim 1, wherein the extracting step further comprises extracting, via a third extracting module, a third feature comprising one or more audio characteristics associated with the data of the video.

4. The method according to claim 3, wherein the audio characteristics of the third feature comprise one or more of a volume, a pitch, a length of an utterance, a duration of an utterance, a content of an utterance, and/or a sentiment of the utterance of or represented by the audio characteristics.

5. The method according to claim 3, wherein the extracting step further comprises extracting, via a fourth extracting module, a fourth feature comprising an input from a user, the input comprising one or more of a text data, a graphic data and/or an image data inputted by one or more subjects during capturing of the video.

6. The method according to claim 5, wherein the fourth feature further comprises one or more of a frequency of input from the user, a duration between respective inputs from the user, a reaction from the user to one or more other users, and/or a degree of responsiveness of the user.

7. The method according to claim 1, further comprising displaying, via a displaying module, one or more of the determined score as a scalar representative of an engagement level of the subject and a suggestion to the subject corresponds to the determined score.

8. The method according to claim 5, wherein the processing step further comprises one or more steps of analyzing, via a third analyzing module, the extracted third feature and analyzing, via a fourth analyzing module, the extracted fourth feature.

9. A computer implemented system for analyzing an engagement level of a subject from a video, the system comprises:

a receiving module configured to receive a data of the video comprising a series of images of the subject;

an extracting module configured to extract features related to the subject shown in the video, the extracting module comprising:

a first extracting module for extracting a first feature comprises one or more visual characteristics related to the subject from one or more images of the series of images comprising the video; wherein the visual characteristics of the first feature comprise one or more facial and/or body characteristics of the subject as shown in the one or more images comprising the video; an a second extracting module for extracting a second feature comprises one or more spatial and/or temporal characteristics related to the subject from the video; wherein the spatial and temporal characteristics of the second feature are represented by a vector data; wherein the vector data comprises an inflated three-dimensional (13D) vector; and an analyzing module adapted to process the extracted first and second features of the subject; the analyzing module comprises a first analyzing module for analyzing the extracted first feature, and a second analyzing module for analyzing the extracted second feature;

wherein the analyzing the extracted first feature and/or the extracted second feature of the first and/or the second analyzing modules comprise processing based on one or more machine learning algorithms; wherein the first analyzing module is configured to process data from the first feature based on a temporal convolution network (TCN) comprising the one or more machine learning algorithms; and wherein the second analyzing module is configured to process data from the second feature based on a multi-layer perceptron neural network (MLP) comprising the one or more machine learning algorithms;

wherein the analyzing module is further adapted to generate an attention weight based on processed data from the first feature and processed data from the second feature; with the generated attention weight being further processed with the data from the first feature to determine a score as a scalar representative of the engagement level of the subject.

10. The system according to claim 9, wherein the extracting module further comprises at least one of a third extracting module for extracting a third feature comprising audio characteristics associated with the video, and a fourth extracting module for extracting a fourth features comprising an input from a user; and the analyzing module further comprises at least one of a third analyzing module for processing the third feature and a fourth analyzing module for processing the fourth feature.

* * * * *